US007550034B2

(12) United States Patent
Janse Van Rensburg et al.

(10) Patent No.: US 7,550,034 B2
(45) Date of Patent: Jun. 23, 2009

(54) GAS FLOW GENERATOR

(75) Inventors: Richard Wilhelm Janse Van Rensburg, Cambridge (GB); Robert Gordon Maurice Selby, Herts (GB); Francoise Florence Dufour, London (GB); Justin Rorke Buckland, Cambridge (GB); John Matthew Somerville, Hertfordshire (GB)

(73) Assignee: The Technology Partnership PLC, Melbourn, Royston (GB)

( * ) Notice: Subject to any disclaimer, the term of this patent is extended or adjusted under 35 U.S.C. 154(b) by 541 days.

(21) Appl. No.: 10/551,788

(22) PCT Filed: Apr. 7, 2004

(86) PCT No.: PCT/GB2004/001526

§ 371 (c)(1), (2), (4) Date: May 16, 2006

(87) PCT Pub. No.: WO2004/090335

PCT Pub. Date: Oct. 21, 2004

(65) Prior Publication Data

US 2006/0201327 A1 Sep. 14, 2006

(30) Foreign Application Priority Data

Apr. 9, 2003 (GB) ................................ 0308197.3

(51) Int. Cl.

*B01D 53/22* (2006.01)
*F04B 45/047* (2006.01)
*F04B 43/04* (2006.01)

(52) U.S. Cl. .................... 96/4; 96/11; 55/400; 55/401; 55/467; 417/413.2; 417/413.3; 417/322

(58) Field of Classification Search ...................... 96/4, 96/11; 55/400, 401, 467; 417/413.2, 413.3, 417/322

See application file for complete search history.

(56) References Cited

U.S. PATENT DOCUMENTS

| | | | | |
|---|---|---|---|---|
| 5,096,388 | A * | 3/1992 | Weinberg | 417/413.3 |
| 5,518,179 | A * | 5/1996 | Humberstone et al. | 239/102.2 |
| 5,525,041 | A * | 6/1996 | Deak | 417/63 |
| 6,164,933 | A * | 12/2000 | Tani et al. | 417/413.2 |
| 6,761,028 | B2 * | 7/2004 | Takeuchi et al. | 60/413 |
| 7,048,519 | B2 * | 5/2006 | Fong et al. | 417/413.2 |
| 7,284,962 | B2 * | 10/2007 | Blakey | 417/413.2 |

FOREIGN PATENT DOCUMENTS

| | | |
|---|---|---|
| DE | 44 22 743 | 1/1996 |
| WO | 93/10910 | 6/1993 |

* cited by examiner

*Primary Examiner*—Jason M Greene

(57) ABSTRACT

A gas flow generator comprising: an ultrasonic driver comprising a piezoelectric or electrostrictive transducer mounted on a substrate, operation of the transducer being arranged to cause the driver to bend; a first membrane disposed on or formed integrally with the transducer or the substrate; and a second membrane mounted substantially parallel with the driver and spaced a given distance therefrom, one of the membranes being perforate, whereby ultrasonic bending of the driver on actuation of the transducer causes a gas flow through the perforate membrane.

11 Claims, 6 Drawing Sheets

FIG. 9
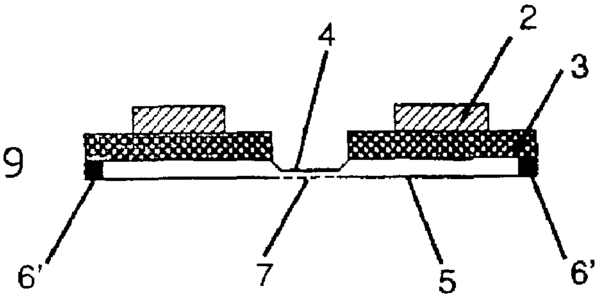
FIG. 10
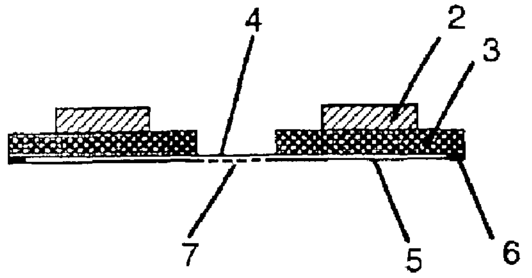
FIG. 11
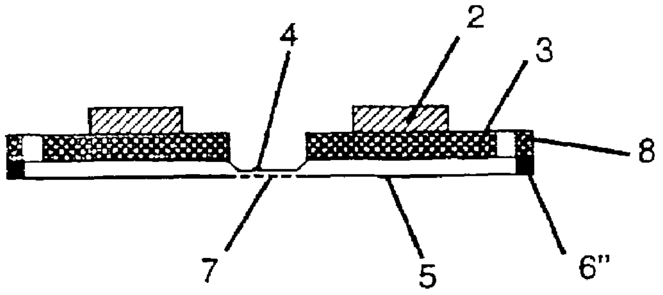
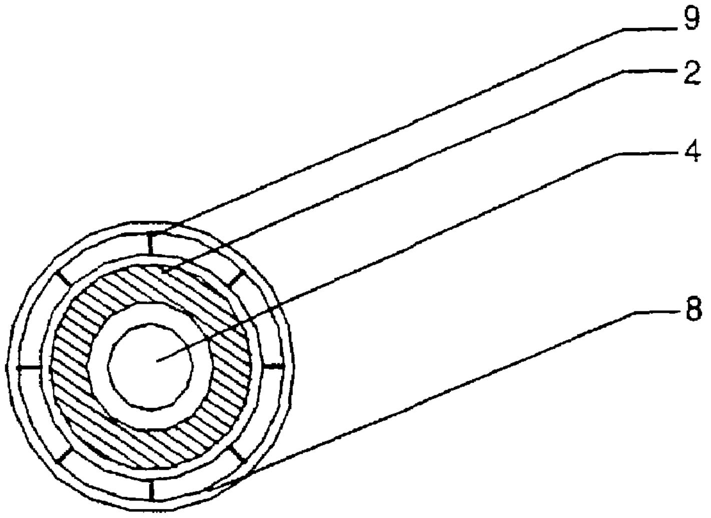
FIG. 12

GAS FLOW GENERATOR

The present invention relates to a gas flow generator and, more particularly, to a gas flow generator incorporating a piezoelectric or electrostrictive device.

Modern electronic devices, particularly portable devices such as laptop computers, mobile telephone and the like are becoming ever more powerful, thus increasing the amounts of electrical power used by, in particular, microprocessors employed in such devices, and therefore there is a growing need for cooling of such microprocessors. Cooling is also required in electro-chemical batteries and other gas flow requirements are to be found in, for example, fuel cells.

Various types of cooling are known, for example using fans, heat pipes or Peltier devices, but these suffer from a number of problems such as expense, noise, power consumed or size, for example. It has been proposed, see U.S. Pat. No. 4,753,579-A, to utilise a piezoelectric transducer to cause movement of a blade, which may be tapered and which may carry a hinged perforated membrane, acting as an amplifier to cause a flow of gas around the blade.

It is also known, see U.S. Pat. No. 5,914,856-A, to utilise a piezoelectric driver in conjunction with a one way valve to cause a flow of gas. However, the requirement to provide highly miniaturised valves is problematic since they are both expensive and prone to failure.

The present invention is aimed at providing a sufficiently strong and efficient gas flow from a thin-walled device capable of being provided with a low profile and having light weight which additionally does not require the use of separate valves.

According to the present invention, there is provided a gas flow generator comprising:

an ultrasonic driver comprising a piezoelectric or electrostrictive transducer mounted on a substrate, operation of the transducer being arranged to cause the driver to bend;

a first membrane disposed on or formed integrally with the transducer or the substrate; and a second membrane mounted substantially parallel with the driver and spaced a given distance therefrom, one of the membranes being perforate, whereby ultrasonic bending of the driver on actuation of the transducer causes a gas flow through the perforate membrane.

The perforate membrane may be either or both of the first or second membranes.

The second membrane may be disposed on or formed integrally with a second ultrasonic driver. In this manner, the second driver will mirror the first driver in a plane through the first and second membranes.

Preferably, the ultrasonic drivers are piezoelectric transducers having a thickness substantially the same as the substrate to which it is mounted and preferably the substrate and the piezoelectric transducer have substantially comparable stiffness which, when the transducer is caused to expand (substantially in the plane of the driver) causes the driver to bend, carrying the first membrane with it. WO-93/10910-A discloses a piezoelectric actuator of a similar type employed for the generation of fluid droplets.

The driver may be operated at mechanical resonance to produce large amplitude vibrations in the bending mode. An annular ultrasonic driver may be used, in which case the substrate may include, either integral or mounted thereon, a non-perforate membrane, effectively closing the central aperture in the driver, with gas flow through the opposing perforate membrane spaced from the substrate, or the perforate membrane may be integral with or mounted on the substrate with the non-perforate membrane being opposed. A further embodiment may include two perforate membranes, one on the substrate and one opposing it, gas flow being through both.

The perforate membrane may then be supported on the substrate of the driver by a spacer, for example, a generally annular spacer and an opening can be provided through the spacer to allow gas flow into a cavity formed between the driver and the perforate membrane. In use, the volume of the cavity alternately expands and contracts creating a differential pressure and hence a gas flow through the device.

In an alternative construction, the first membrane is perforate and gas flow is through the aperture in the annular driver.

The second membrane may be mounted, preferably via a spacer, on an annulus which itself is connected to the driver by means of a plurality of spokes, wherein the annulus surrounds the outer portion of the driver.

One or each of the membranes may have an irregular shape and, preferably, this shape includes a plurality of channels which may extend substantially towards the centre of the membrane, so as to increase the effective outer perimeter of the membrane. It is preferable for at least some of the perforations to be arranged around the perimeter of the membrane, preferably at a substantially similar distance from the edge.

The gas flow generator according to the present invention may also be provided with one or more heat sinks and these may be either single or double sided. The heat sinks are arranged so as to be in the line of gas flow away from the perforate membrane.

The gas flow can be used to cool microelectronic and other devices as mentioned above or to supply gas flow for other purposes though devices requiring a gas flow therethrough.

Examples of gas flow generators constructed in accordance with the present invention will now be described with reference to the accompanying drawings in which.

Figure 1:
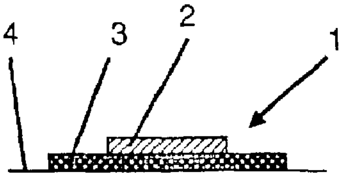
FIGS. 1 and 2 are cross-sections through thin-walled ultrasonic drivers which may be used in a generator of the present invention.
Figure 2:
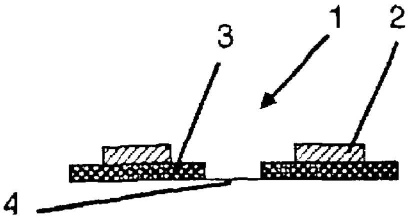
Figure 3:
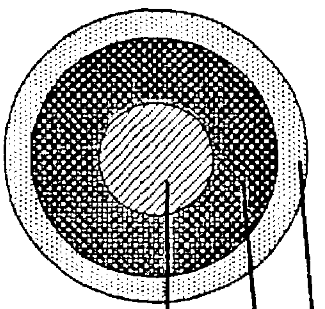
FIGS. 3 and 4 illustrate plan views of the same drivers.
Figure 4:
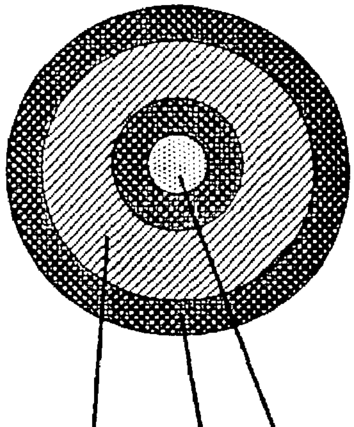
Figure 5:
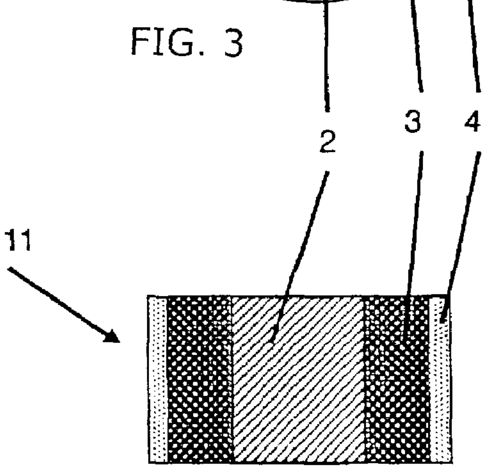
Figure 6:
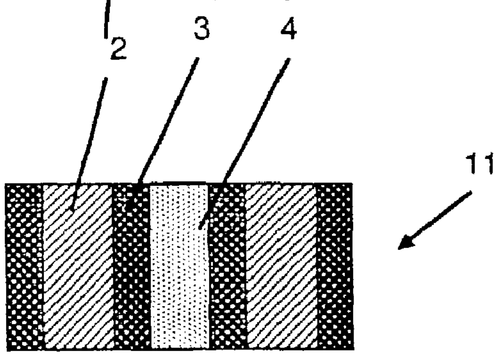
Figure 7:
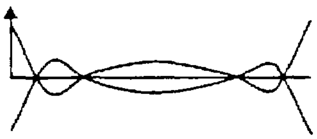
Figure 8:
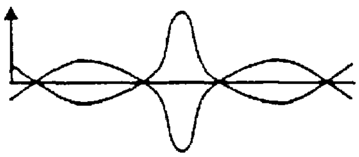
Figure 13:
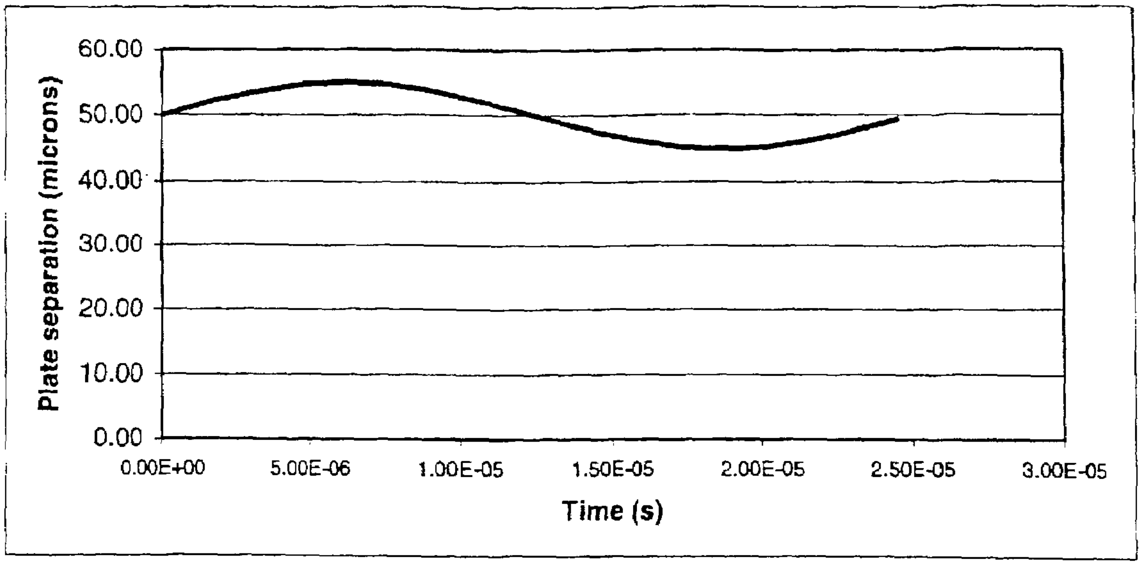
Figure 14:
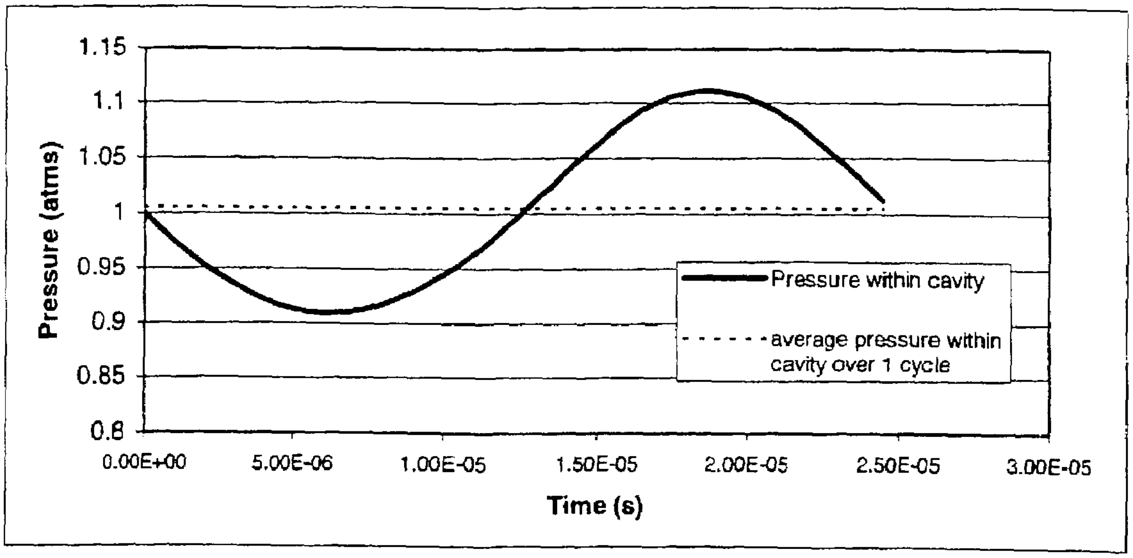
Figure 15A:
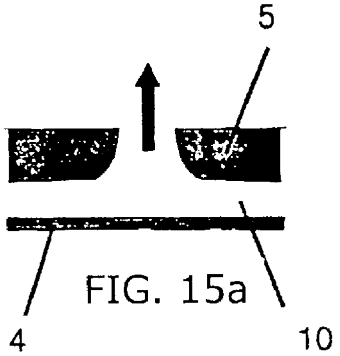
Figure 15B:
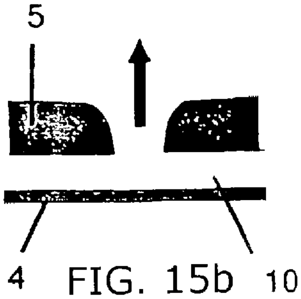
Figure 15C:
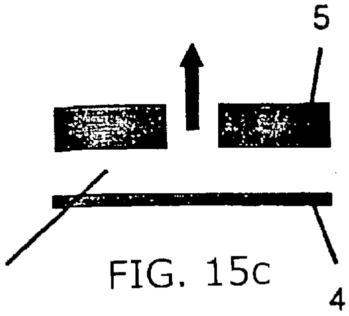
Figure 16:
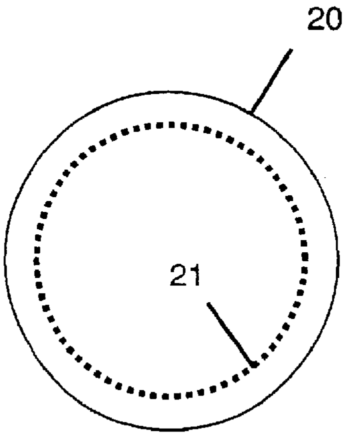
Figure 17:
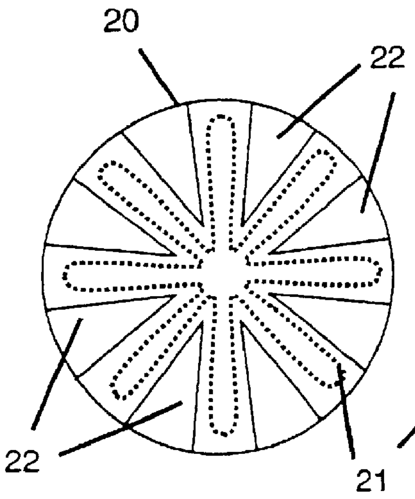
Figure 18:
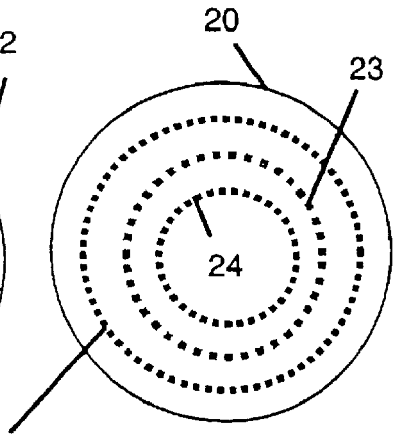
Figure 17A:
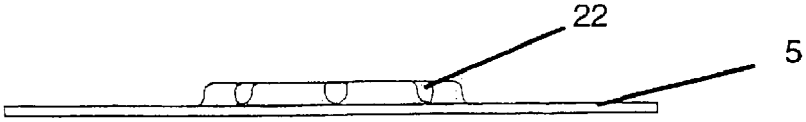
Figure 17B:
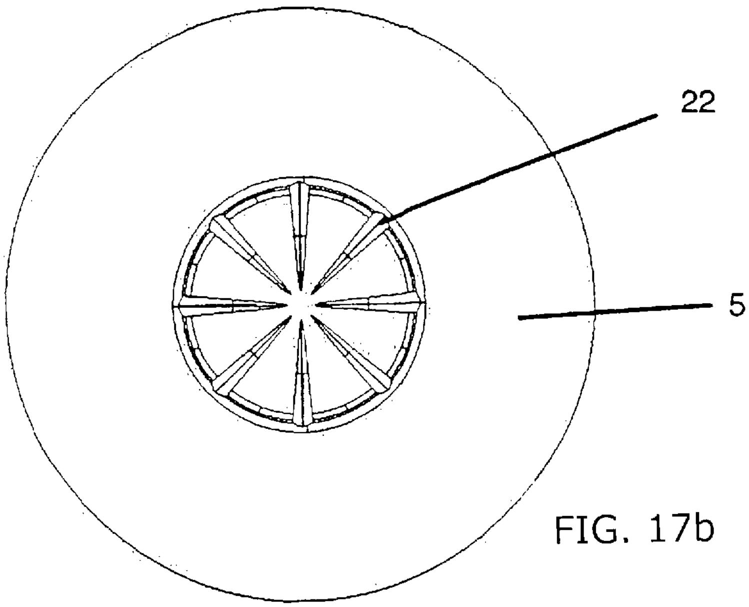
Figure 19A:
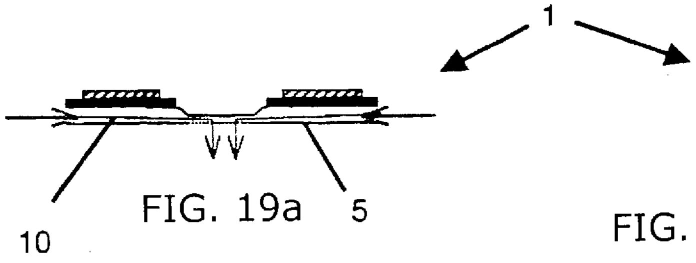
Figure 19B:
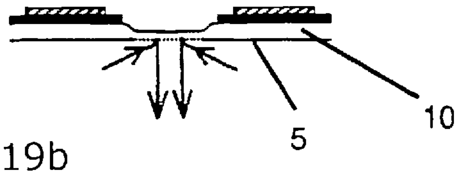
Figure 20A:
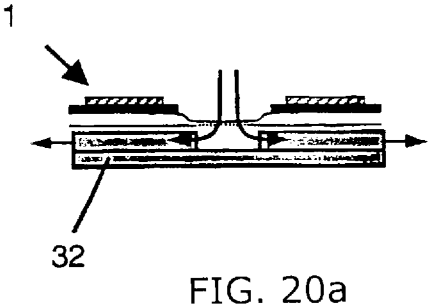
Figure 20B:
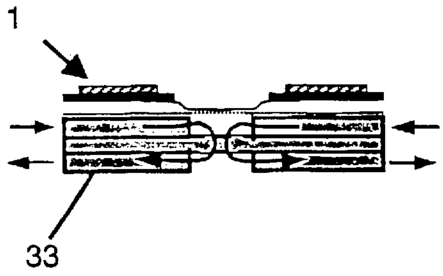
Figure 21A:
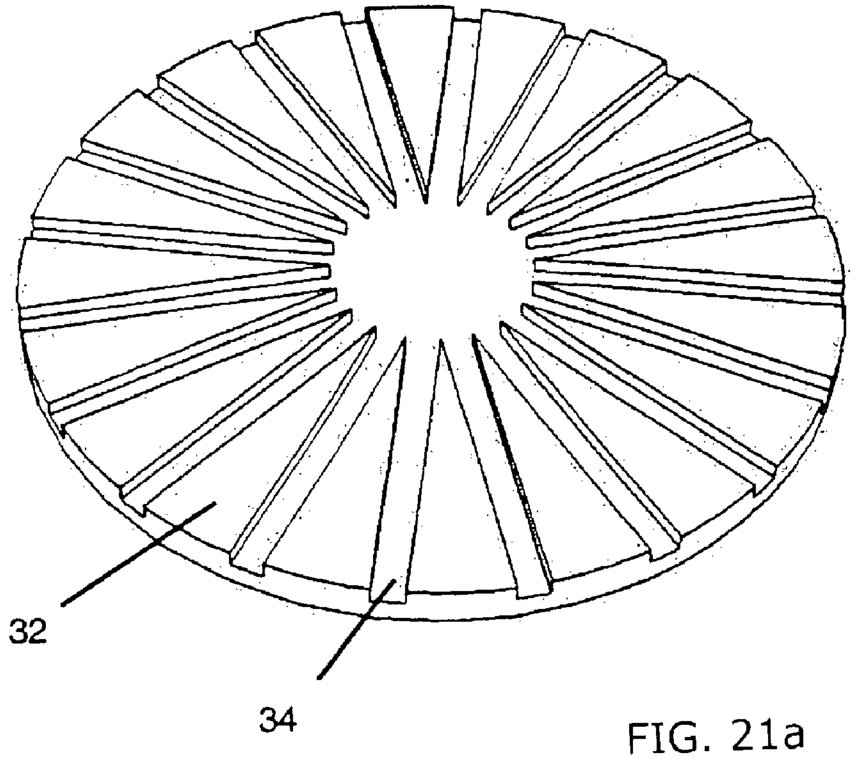
Figure 21B:
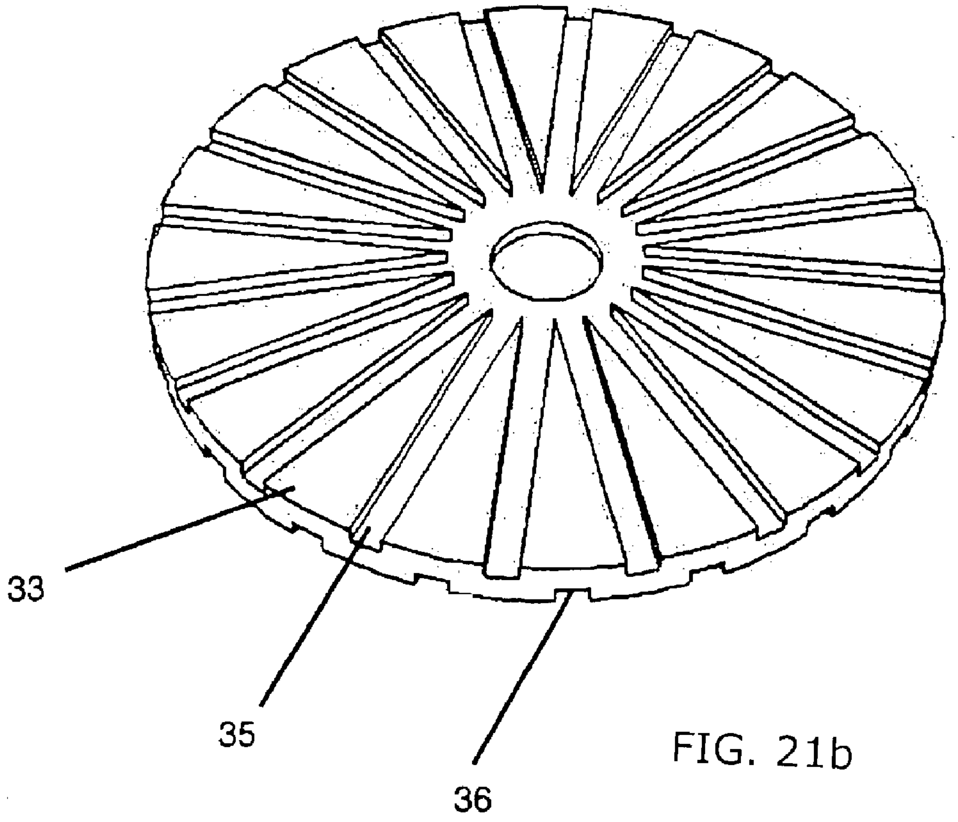

FIGS. 5 and 6 illustrate two further drivers, in plan view, but rectangular in outline, rather than circular as in FIGS. 3 and 4, but having substantially the same cross-section (see therefore FIGS. 1 and 2);

FIGS. 7 and 8 illustrate the bending modes of the drivers of FIGS. 1 and 2 respectively;

FIGS. 9, 10 and 11 illustrate examples of generators according to the present invention in cross-section;

FIG. 12 is a plan view of the generator shown in cross-section in FIG. 11;

FIGS. 13 and 14 are graphs showing typical membrane separation during actuation of the driver and corresponding pressures developed within the cavity between the membranes, respectively;

FIGS. 15*a* to 15*c* show different possible cross-sections for the perforations in a perforate membrane;

FIGS. 16 to 18 show different arrangements of perforations in the perforate membrane;

FIGS. 17*a* and 17*b* show side and plan views respectively of the membrane shown in FIG. 17;

FIG. 19*a* illustrates the flow of gas through a device operating in a pump mode;

FIG. 19*b* illustrates the gas flow when the present invention is operating in a jet mode;

FIGS. 20*a* and 20*b* show schematic cross sectional views through a device according to the present invention when used with a single and a double heat sink, respectively; and FIGS. 21*a* and 21*b*) show perspective views of a single and a double heat sink, respectively.

FIGS. 1 and 3 illustrate a first ultrasonic driver 1, in the form of a disc 2 of a piezoelectric material (e.g. PZT) bonded to a larger diameter disc of stainless steel 3 on one side, on the other side of the stainless steel 3 disc being bonded a circular stainless steel membrane 4. An active ultrasonic driver is formed by connecting electrodes on opposite sides of the piezoelectric disc 2 (which are not shown—for purposes of clarity) so that when an electric field is applied across the piezoelectric disc 2 and it responds by attempting to change shape. As long as the substrate 3 and the piezoelectric material 2 are of comparable stiffness, the driver is caused to bend and, when operated at mechanical resonance, large vibration amplitudes can be created in the substrate. In turn therefore the stainless steel membrane 4 is also caused to flex.

A similar driver is shown in FIGS. 2 and 4 and the same reference numerals are used for simplicity, but in this case the piezoelectric disc 2 and the substrate 3 are annular. The stainless membrane is circular and effectively closes the aperture in the centre of the substrate 3.

Corresponding linearly-acting rectangular drivers 11 are shown in FIGS. 5 and 6 with the same numbers being used for similar components for ease of reference.

The bending modes of the drivers shown in FIGS. 1, 3 and 5 and 2, 4 and 6 respectively and used in the generality of FIGS. 9 to 11, are shown in FIGS. 7 and 8.

The driver shown in FIG. 2 is incorporated in a gas flow generating device as shown in FIGS. 9, 10 and 11. In the device shown in FIG. 10, a second stainless membrane 5 is shown spaced at a suitable distance, typically up to 10 mm, from the membrane 4 and is held in position by an annular spacer 6, thereby forming a cavity 10 between the membrane 5 and the driver 1. However, a flow maxima is generally seen when the separation between the membranes is small, typically less than 200 μm, but as the separation is increased a series of additional maxima are seen. These are thought to be due to resonant behaviour in the cavity. The centre part of the stainless membrane 5 is provided with perforations 7 therethrough which may be in the form of tapered or non-tapered orifices. Some examples of orifice shapes are shown in FIGS. 15*a* to 15*c*. The tapered orifices may be forward tapered, i.e. narrowing in the direction of flow as shown in FIG. 15*a* or reverse-tapered, i.e. narrowing in the opposite direction as shown in FIG. 15*b* to the flow.

In the example generator shown in FIG. 9, the membrane 4 is deformed at its centre to form a domed portion, and is accordingly closely spaced from the membrane 5. The remainder of the membrane 5 is held at a greater distance from the remainder of the driver 1 by a spacer 6', thus providing the cavity 10 between the membranes with a larger volume than the corresponding cavity in FIGS. 9 or 11.

The example generator shown in FIG. 11 is broadly similar to that of FIG. 9, but avoids any direct coupling between the membrane 5 and the driver 1 by supporting the membrane 5 via the spacer 6'' on an annulus 8 which is connected to the substrate 3 of the driver 1 by a plurality of spokes 9 (see FIG. 12).

The generator of the present invention may operate in one of several different modes, although it is not, at this stage, apparent exactly what conditions on the device and the gas which is to be moved ensures that any particular mode is the one in which the generator operates.

In operation of all of the devices shown above, the membrane 4 attached to the driver is caused to vibrate so that the cavity between the membranes 4,5 alternately expands and contracts. The device can operate such that sinusoidal movement between the two membranes compresses and rarifies the air. Asymmetry, resulting either from the size, shape or direction of tapering of the holes or in the position of the driver, enables a differential pressure to be generated within the cavity as shown in FIG. 14 so that a DC gas flow is caused from the inside and the outside of the cavity 10. In the device shown in FIG. 11, gas flow may be through the gap from the annulus 8 and the substrate 3, into the cavity 10 and then through the perforations in the membrane 5, but in other constructions gas flow may be through apertures (not shown) formed in the membrane 4 or in the spacers 6, 6'.

Alternatively, the generator can act as a compression pump with an inlet, e.g. the gap between the two membranes 4, 5, and an outlet, e.g. the holes in perforate membrane 5. When the piezoelectric disc 2 is driven, the pressure behind the holes varies harmonically with the separation of the two membranes. The two membranes moving relative to each other causes partial valving such that when the membranes are close together, the valve is "closed" and when they are their furthest separation, the valve is 'open'. When the pressure behind the holes is at a maximum, the resistance of the gap between the plate is also at a maximum. When the pressure behind the holes is at a minimum, the resistance with the gap between the plates is also at a minimum. This results in a net flow of gas from the inlet to the outlet.

In this operation, the flow rate is typically limited by the viscous drag of the gas through the gap between the membranes 4, 5 and there is an optimum restriction between the plates for a given hole size in the perforate membrane 5. When the separation between the driver and the membrane is small, this optimum occurs when the average resistance of the gap between the two membranes and the resistance through the holes is equal. However, this also means that there is an optimum position of the perforations in the membrane 5. FIG. 16 illustrates the location of this optimum hole position, relative to the outer edge 20 of the domed portion of the membrane 4. In FIG. 16, only a single ring of holes 21 through perforate membrane 5 can be in the optimum position, namely a set distance from the inlet ie the edge 20 of the domed portion of the driven membrane area. To improve this, the membrane can be shaped as shown in FIG. 17 in which channels 22 are formed in the perforate membrane 5, so as to increase the effective perimeter of the membrane. This results in the number of perforations in the optimum location 21 increasing, as a result of the larger effective perimeter. Alternatively, and as shown in FIG. 18, inlet holes 23 (typically larger than the perforations) can be provided in the membrane 4, midway between the centre and the edge of the domed portion of membrane 4 and, as such, a further inner ring of optimum hole positions 24 is created in the perforate membrane 5. FIGS. 17*a* and 17*b* show a version of the membrane 5 of FIG. 17, in which 8 channels 22 are provided and in which the perforate portion is domed.

As mentioned above, the holes through the perforate membrane 5 may be tapered as shown in FIGS. 15*a* and *b* and, as this creates an asymmetric sinusoidal pressure variation as the membranes are moved relative to each other, the tapers on the holes create a net DC flow. The taper on the orifice acts as a passive valve. FIG. 15*c* illustrates a non-tapered orifice.

In the arrangement shown in FIG. 19*a*, the gas flow generator 1, similar to that in FIG. 10, operates so as to produce a pump flow through the perforate membrane 5, drawing gas in to the cavity 10 from its edge. In contrast, in FIG. 19*b*, air oscillates through the perforations in membrane 5. On the compressive stroke, a highly directional inertial jet is generated from the perforations, whilst on the opposing stroke, a more isotropic flow is created through the perforations into the cavity 10. This causes a strong jet flow perpendicular to the surface of the membrane.

Any of the devices previously described can be used, in conjunction with a heat sink to help dissipate heat from electrical components. Such arrangements are shown in FIGS. 20*a* and 20*b* in which a gas flow generator substantially similar to the arrangement shown in FIG. 9 is spaced a short distance from the upper surface of a respective single or double heat sink. In FIG. 20*a* a single heat sink is mounted adjacent the perforate membrane 5 such that the pumped flow from the perforate membrane 5 flows from the centre, radially outward in the plurality of channels 34 (see FIG. 21*a*). In the arrangement in FIG. 20*b*, a double sided heat sink 33 is provided and this is of particular use when the gas flow generator is operating in the jet mode, as per FIG. 19*b*, as the gas which is drawn along the face of the perforate membrane 5 is also cause to flow along the upper side of the heat sink in channels 35. The jet flow from perforate membrane 5 passes through the centre of the heat sink. The jet flow then passes through channels 36 on the underside of the heat sink 33 (see FIG. 21*b*).

The separation between the two membranes 4, 5 may be from 0.01 mm to 10 mm, but preferably is no more than 1 mm and is preferably less than 200 μm. The size of the perforations through the membrane 5 is preferably in the range of 5 to 150 microns diameter and are typically spaced at a 500 micron hexagonal pitch. The preferred hole size is, however, between 25 and 125 microns. In testing, the gas flow generator of the present invention has been shown to cool a 1 watt load by 17° C., i.e. for 87° C. without the present invention to 70° C. with the present invention, when the generator and the heat load are separated by 2 mm. This is when the device is operating to generate a jet from the surface of the device.

The particular direction of the gas flow will be determined to the particular use by which the gas flow generator is put in practise.

In examples tested to date, perforations with a hole size of 50 to 150 μm at a pitch of 350 to 800 μm have been utilised, together with a driver operating with a 5 μm amplitude. Operation with smaller diameter holes and correspondingly smaller diameter pitch between the holes and smaller separation between the membranes will create lower flow rates but at higher pressures. For example 7 micron diameter holes on 60 micron pitch were found to create pressures up to 10 kPa.

Although stainless steel has been used for the membranes shown in the examples, other materials such as Kapton and brass may be utilised where desirable or acceptable.

The invention claimed is:

1. A gas flow generator comprising:

an ultrasonic driver comprising a piezoelectric or electrostrictive transducer mounted on a substrate, operation of the transducer being arranged to cause the driver to bend;

a first membrane disposed on or formed integrally with the transducer or the substrate; and a second membrane mounted substantially parallel with the driver and spaced a given distance therefrom, one of the membranes being perforate, whereby ultrasonic bending of the driver on actuation of the transducer causes a gas flow through the perforate membrane.

2. A gas flow generator according to claim 1, wherein either or both of the first or second membranes is perforate.

3. A gas flow generator according to claim 1, wherein the second membrane is disposed on or formed integrally with a second ultrasonic driver.

4. A gas flow generator according to claim 1, wherein one or each of the ultrasonic drivers is a piezoelectric transducer.

5. A gas flow generator according to claim 4, wherein the substrate and the piezoelectric transducer have substantially comparable stiffness.

6. A gas flow generator according to claim 1, wherein the ultrasonic driver is annular.

7. A gas flow generator according to claim 1, wherein the second membrane is supported on the substrate of the driver by a spacer.

8. A gas flow generator according to claim 7, wherein the spacer is generally annular and has an opening through which gas can flow into and out of a cavity formed between the driver and the second membrane.

9. A gas flow generator according to claim claim 7, wherein the spacer is mounted on an annulus which is connected to the ultrasonic driver by means of a plurality of spokes.

10. A gas flow generator according to claim 1, wherein one or both of the first and second membranes is provided with one or more channels.

11. A gas flow generator according to claim 1, wherein the ultrasonic driver is linear.

* * * * *